US012724642B2

(12) United States Patent
Zad Tootaghaj et al.

(10) Patent No.: US 12,724,642 B2
(45) Date of Patent: Sep. 1, 2026

(54) DISTRIBUTING WORKLOADS TO HARDWARE ACCELERATORS DURING TRANSIENT WORKLOAD SPIKES

(71) Applicant: HEWLETT PACKARD ENTERPRISE DEVELOPMENT LP, Houston, TX (US)

(72) Inventors: Diman Zad Tootaghaj, Milpitas, CA (US); Anu Mercian, Santa Clara, CA (US); Puneet Sharma, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 879 days.

(21) Appl. No.: 17/683,524

(22) Filed: Mar. 1, 2022

(65) Prior Publication Data

US 2023/0281052 A1 Sep. 7, 2023

(51) Int. Cl.
*G06F 9/50* (2006.01)
*H04L 47/80* (2022.01)
*H04L 47/83* (2022.01)

(52) U.S. Cl.
CPC ............ *G06F 9/505* (2013.01); *H04L 47/805* (2013.01); *H04L 47/83* (2022.05); *G06F 2209/5019* (2013.01); *G06F 2209/508* (2013.01)

(58) Field of Classification Search
None
See application file for complete search history.

(56) References Cited

U.S. PATENT DOCUMENTS 8,930,948 B2 * 1/2015 Shanmuganathan ........................ G06F 9/5016 718/1
9,680,774 B2 6/2017 Pirko
9,692,642 B2 6/2017 Pirko
10,484,301 B1 * 11/2019 Shukla .................. G06F 3/0605
11,303,534 B2 * 4/2022 Tootaghaj ........... H04L 41/5054
11,436,054 B1 * 9/2022 Zad Tootaghaj .... G06F 9/45558
11,513,828 B1 * 11/2022 Zelenov .............. G06F 9/45558
11,526,376 B2 * 12/2022 Zhang .................. G06F 9/4812
12,136,040 B2 * 11/2024 Benmakrelouf ....... G06N 3/086
(Continued)

OTHER PUBLICATIONS

Islam et al.; "Empirical prediction models for adaptive resource provisioning in the cloud"; Future Generation Computer Systems 28 (2012) 155-162; 2011 Elsevier B.V. All rights reserved; doi:10.1016/j.future.2011.05.027; (Islam_2011.pdf) (Year: 2011).*
(Continued)

*Primary Examiner* — Hiren P Patel
(74) *Attorney, Agent, or Firm* — Dickinson Wright

(57) ABSTRACT

Systems and methods are provided for strategically harvesting untapped compute capacity of hardware accelerators to manage transient workload spikes at computing systems, are provided. Examples provide a low-cost and scalable computing system which orchestrates seamless offloading of workloads to hardware accelerators during transient workload spikes. By utilizing hardware accelerators as short-term emergency buffers, examples improve upon existing approaches which deploy more expensive, and often significantly under-utilized servers for these emergency purposes. Accordingly, examples may reduce the occurrence of SLA violations while minimizing capital expenditure in computing power.

18 Claims, 11 Drawing Sheets

(56) References Cited

U.S. PATENT DOCUMENTS

| | | | | |
|---|---|---|---|---|
| 2005/0050187 | A1* | 3/2005 | Freimuth | H04L 47/70 709/223 |
| 2005/0177549 | A1* | 8/2005 | Hornick | G06F 9/505 |
| 2011/0179057 | A1* | 7/2011 | Wojcik | G06F 16/217 707/769 |
| 2015/0253837 | A1 | 9/2015 | Sukonik et al. | |
| 2016/0128059 | A1* | 5/2016 | Hsu | H04W 24/00 370/336 |
| 2017/0083382 | A1* | 3/2017 | LeBeane | G06F 1/3293 |
| 2017/0090992 | A1* | 3/2017 | Bivens | G06F 9/5072 |
| 2018/0027062 | A1* | 1/2018 | Bernat | G08C 17/02 |
| 2018/0307535 | A1* | 10/2018 | Suzuki | G06F 3/061 |
| 2019/0188043 | A1* | 6/2019 | Jalai | G06F 9/4875 |
| 2019/0222518 | A1 | 7/2019 | Bernat et al. | |
| 2020/0026576 | A1 | 1/2020 | Kaplan | |
| 2020/0097810 | A1* | 3/2020 | Hetherington | G06N 3/09 |
| 2020/0310886 | A1* | 10/2020 | Rajamani | G06F 9/45558 |
| 2021/0042661 | A1* | 2/2021 | St-Onge | G06N 3/126 |
| 2021/0064432 | A1* | 3/2021 | Benmakrelouf | G06N 7/01 |
| 2021/0144517 | A1* | 5/2021 | Guim Bernat | H04L 9/3247 |
| 2021/0184942 | A1* | 6/2021 | Tootaghaj | H04L 41/5054 |
| 2022/0321434 | A1* | 10/2022 | Kuriata | H04L 43/0858 |
| 2022/0360645 | A1* | 11/2022 | Badic | H04L 67/51 |
| 2022/0377612 | A1* | 11/2022 | Radunovic | H04W 28/0284 |
| 2022/0405127 | A1* | 12/2022 | Huo | G06F 9/5027 |
| 2022/0413895 | A1* | 12/2022 | Nizar | G06F 9/466 |
| 2023/0195485 | A1* | 6/2023 | Nagasundaram | G06F 9/5077 718/1 |
| 2023/0274160 | A1* | 8/2023 | Mujumdar | G06N 3/044 706/12 |

OTHER PUBLICATIONS

Alelaiwi et al.; "An efficient method of computation offloading in an edge cloud platform"; Journal of Parallel and Distributed Computing 127 (2019) 58-64; 2019 Elsevier Inc.; https://doi.org/10.1016/j.jpdc.2019.01.003 (Alelaiwi_2019.pdf) (Year: 2019).*

Miao et al.; "Intelligent task prediction and computation offloading based on mobile-edge cloud computing"; Future Generation Computer Systems 102 (2020) 925-931; 2019 Elsevier Inc.; https://doi.org/10.1016/j.future.2019.09.035 (Miao_2019.pdf) (Year: 2019).*

Baig et al.; "Adaptive sliding windows for improved estimation of data center resource utilization"; 2019 published by Elsevier B.V.; https://doi.org/10.1016/j.future.2019.10.026; (Baig_2019.pdf) (Year: 2019).*

Abdullah et al., "Burst-Aware Predictive Autoscaling for Container", IEEE Transactions on Services Computing, May 2020, 14 pages.

Choi et al., "Lambda -NIC: Interactive Serverless Compute on Programmable SmartNICs", Sep. 26, 2019, pp. 1-15.

D. Coulter et al., "Performance Tuning Network Adapters", Microsoft Docs, Dec. 23, 2019, 13 pages.

Firestone et al., "Azure Accelerated Networking: SmartNICs in the Public Cloud", 15th USENIX Symposium on Networked Systems Design and Implementation, Apr. 9-11, 2018, 15 pages.

Kim et al., "HyperLoop: Group-Based NIC-Offloading to Accelerate Replicated Transactions in Multi-Tenant Storage Systems", ACM, 2018, pp. 297-312.

Krishnamurthy et al., "E3: Energy-Efficient Microservices on SmartNIC-Accelerated Servers", Proceedings of the 2019 USENIX Annual Technical Conference, Jul. 10-12, 2019, 17 pages.

Liu et al., "iPipe: A Framework for Building Distributed Applications on Multicore SoC SmartNICs", SIGCOMM'19, 2019, pp. 1-18.

Liu et al., "Offloading Distributed Applications onto SmartNICs using iPipe", ACM, Aug. 19-23, 2019, 16 pages.

Phothilimthana et al., "Floem: A Programming System for NIC-Accelerated Network Applications", Usenix, Oct. 8-10, 2018, 18 pages.

Wikipedia, "PID controller", available online at <https://en.wikipedia.org/wiki/PID_controller#Overview_of_tuning_methods>, Mar. 25, 2021, 26 pages.

Ziegler et al., "Optimum Settings for Automatic Controllers," Transactions of the A.S.M.E., Nov. 1942, pp. 759-768.

Agilio CX SmartNICs', available online at <http://web.archive.org/web/20170914210510/https://netronome.com/products/agilio-cx/>, Sep. 14, 2017, 10 pages.

"AMD Pensando™ Infrastructure Accelerators", available online at <http://web.archive.org/web/20240406203031/https://www.amd.com/en/accelerators/pensando>, Apr. 6, 2024, 12 pages.

"SPIFFE: Secure Production Identity Framework for Everyone", available online at <http://web.archive.org/web/20200301121129/https://spiffe.io/>, Mar. 1, 2020, 5 pages.

Akkus et al., "SAND: Towards High-Performance Serverless Computing", 2018 USENIX Annual Technical Conference (USENIX ATC '18). Jul. 11-13, 2018, 14 pages.

Alrowaily et al., "Secure Edge Computing in IoT Systems: Review and Case Studies", In 2018 IEEE/ACM Symposium on Edge Computing (SEC). IEEE, 2018, 5 pages.

Broadcom, "Ethernet Network Adapters", available online at <https://www.broadcom.com/products/ethernet-connectivity/network-adapters>, 2005, 4 pages.

Chien et al., "Moore's Law: The First Ending and a New Beginning", IEEE, 2013, 6 Pages.

Github, "Azure/AzurePublicDataset", available online at <http://web.archive.org/web/20180604111946/https://github.com/Azure/AzurePublicDataset/>, Jun. 4, 2018, 2 pages.

Hendrickson et al., "Serverless Computation with OpenLambda", 2016, 7 pages.

Liu et al., "E3: energy-efficient microservices on SmartNIC-accelerated servers", 2019 USENIX Annual Technical Conference. Jul. 10-12, 2019, 17 pages.

Liu et al., "iPipe: A FrameworkforBuilding Distributed Applications onMulticoreSoCSmartNICs", In Proceedings of the ACM Special Interest Group on Data Communication (SIGCOMM), 2019, 18 pages.

Lloyd et al., "Serverless Computing: An Investigation of Factors Influencing Microservice Performance", 2018, 11 pages.

Nvidia, "Nvidia Mellanox DPU & NPU", available online at <http:/web.archive.org/web/20201002054710/https://www.nvidia.com/en-us/networking/products/data-processing-unit/>, Oct. 2, 2020, 3pages.

Qiu et al., "Clara: Performance Clarity for SmartNIC Offloading", ACM, 2020, 7 Pages.

Shahrad et al. "Serverless in the wild: Characterizing and optimizing the serverless workload at a large cloud provider", In USENIX Annual Technical Conference (USENIX ATC), 2020, 15 pages.

Valuates, "Edge Computing Market—Global Opportunity Analysis", available online at <https://reports.valuates.com/market-reports/360I-Auto-3U70/edge-computing-market/>, 2018, 5 pages.

Wang et al., "Edge Computing: Applications, State-of-the-Art and Challenges ", Advances in Networks 2019; 7(1): 8-15.

Wang et al., "Peeking Behind the Curtains of Serverless Platforms", 2018 USENIX Annual Technical Conference (USENIX ATC '18). Jul. 11-13, 2018, 14 pages.

* cited by examiner

DISTRIBUTING WORKLOADS TO HARDWARE ACCELERATORS DURING TRANSIENT WORKLOAD SPIKES

BACKGROUND

Hardware accelerators may refer to pieces of computer hardware designed to perform specific functions. Examples of hardware accelerators include smart network interface cards (SmartNICs), graphics processing units (GPUs), tensor processing units (TPUs), data processing units (DPUs), network accelerators, etc. In general, hardware accelerators have smaller processing cores than computing units (i.e. CPUs) used in general-purpose computers such as servers. While hardware accelerators are generally cheaper than general-purpose computers, they have less compute capacity.

The explosion of Internet-of-Things (IoT)-based solutions and applications continue to drive the growth of edge-computing systems. The adoption of serverless frameworks for IoT edge applications is growing as well. However, provisioning for added edge computing needs on an ephemeral basis, has proven to be a difficult task.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
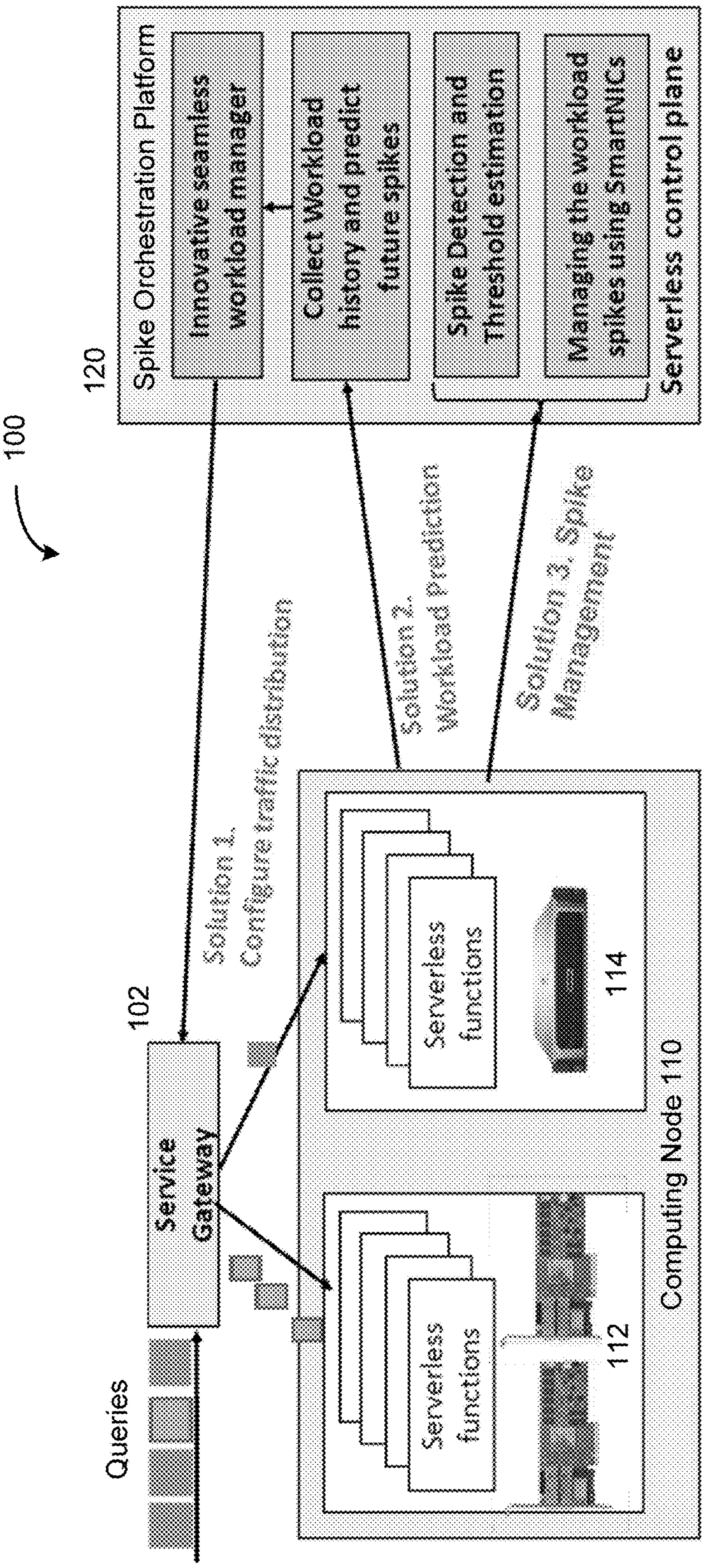
FIG. 1 depicts an example edge-computing system, in accordance with various examples of the presently disclosed technology.

The figures are not exhaustive and do not limit the present disclosure to the precise form disclosed.

DETAILED DESCRIPTION

Transient workload spikes (e.g. short-lived bursts in demand for computing resources) for edge-computing systems can often overwhelm the computing resources of the edge-computing system (typically edge servers), resulting in slower response/service times. This reduction in performance can often cause service-level agreement (SLA) violations. An SLA may refer to a contract between a service provider and one or more clients which describes the quality standards (e.g. service time/query response time, service rate/query response rate, request inter arrival times, service availability, etc.) that the service provider will maintain. SLA violations can result in severe penalties (e.g. financial penalties, service credits, etc.). Accordingly, a common way to eliminate SLA violations is to over-allocate computing resources by deploying more edge servers than necessary to handle typical workloads for the edge-computing system. This leads to the under-utilization of what can be expensive resources.

Hardware accelerators are generally cheaper than general-purpose computers like edge servers but have less computing power/capacity. As a result, hardware accelerators typically have longer service times than edge servers (as used herein service time may refer to the amount of time it takes a computing unit to respond to a client query). Accordingly, while hardware accelerators (e.g., SmartNICs) have been used to support edge servers with certain networking functions (e.g., generating packet headers, forwarding packets, etc.), they have not been used for non-networking functions (e.g., responding to client/customer queries or other application specific workloads). In other words, hardware accelerators can be highly proficient when performing particular tasks, but are less proficient at general purpose computing. For analogy, just as a restaurant's accountant may be highly proficient at keeping books, he will be less proficient at other restaurant-related tasks such as serving tables, preparing food, etc. Accordingly, the restaurant's accountant is typically relegated to the back office during a dinner service.

However, when the restaurant gets a sudden rush of customers, even the best cooks and "servers" may become overwhelmed. Similarly, when the edge servers of an edge-computing system receive a transient workload spike (e.g., a sudden spike in customer queries), their service times will increase, sometimes significantly. This increase in service time during transient workload spikes can result in SLA violations. As examples of the presently disclosed technology appreciate, in many cases the service times of an overloaded edge server will exceed the service time of a hardware accelerator under a normal (i.e., non-spike) workload. Extending the restaurant analogy from above, examples of the presently disclosed technology recognize that when the restaurant experiences a sudden rush of customers, in order to improve the service time of the entire restaurant, the accountant (and maybe even some of his accountant friends) should be handed a server's uniform or a chef's coat and given a chance to shine.

Accordingly, examples of the presently disclosed technology provide a computing system which strategically deploys the untapped compute capacity of hardware accelerators to manage transient workload spikes (this computing system may be an edge-computing system, but also may be implemented in non-edge environments). In other words, examples provide a low-cost and scalable computing platform which orchestrates seamless offloading of workloads (e.g. serverless queries) to hardware accelerators during transient workload spikes. By utilizing hardware accelerators as short-term emergency buffers, examples improve upon existing approaches which deploy more expensive, and often significantly under-utilized servers for these emergency purposes. Accordingly, examples may reduce the occurrence of SLA violations while minimizing capital expenditure in computing power.

In various examples a computing system comprised of one or more servers and one or more hardware accelerators, is provided. In certain examples, the servers may serve all (or substantially all) received client workloads (i.e. application specific workloads) in the absence of a transient workload spike. The computing platform may also include a spike orchestration platform comprised of (i) a traffic distribution module, (ii) a workload prediction module, and (iii) a spike orchestration module. This spike orchestration platform may orchestrate received client workloads between the server(s) and hardware accelerator(s) in a manner which avoids SLA violations during transient workload spikes (e.g., a short-lived burst of queries).

In certain examples, the computing system described above may be implemented in a containerized workload environment. Containers are technology used to bundle an application with all its necessary files into one runtime environment. Containerized workload platforms such as Kubernetes and Docker facilitate the management of containerized applications. Accordingly, examples may utilize these containerized workload platforms to allocate workload containers across server(s) and hardware accelerator(s) of the computing system. Accordingly, workloads can be distributed to these workload containers in a manner that ensures that no workload container becomes overwhelmed/overloaded during a spike. In some examples, proactive management of workloads in anticipation of a predicted transient workload spike may involve starting one or more workload containers of a hardware accelerator before the arrival of the transient workload spike. As will be described below, this may reduce the impact of cold-start latency during the transient workload spike As described above, examples of the presently disclosed technology can be generalized for computing systems across multiple servers and different kinds of hardware accelerators (e.g. SoC-based SmartNICs, ASIC-based SmartNICs, GPUs, network accelerators, etc.). In other words, examples can scale application offload across different dimensions of heterogeneity. This approach may secure a competitive advantage in comparison to legacy computing system architectures and deployments.

FIG. 1 depicts an example edge-computing system, in accordance with various examples of the presently disclosed technology. Edge-computing system 100 includes a service gateway 102, computing nodes 110, and a spike orchestration platform 120. As will be described in greater detail in conjunction with FIG. 3, in various examples edge-computing system 100 can be deployed in a containerized work environment.

Service gateway 102 may be a network component (hardware or software) which receives queries from a network and distributes them to computing nodes 110. Here, a query may refer to a demand for computing resources sent by a client. In certain examples, such a query may be a function invocation (for background, serverless platforms allow a given application to be packaged as one or more containers, and managed as a function. Once a function has been deployed in a serverless platform, clients can invoke them by sending "serverless queries." For example, a Key-Value Store (KVS) can be a serverless function packaged as one or more containers. Clients can invoke the KVS function by sending serverless queries. When incoming queries increase—the serverless platform can scale the number of KVS containers to balance/manage the incoming increase in workload).

Computing nodes 110 comprises edge server 114 and hardware accelerator 112. While only one edge server is depicted in the example of FIG. 1, in other examples computing nodes 110 may comprise additional edge servers. Similarly, computing nodes 110 may comprise any number of hardware accelerators. Where computing nodes 110 includes multiple hardware accelerators, the hardware accelerators may be of the same type (i.e., homogeneous) or of different types (i.e., heterogeneous).

Edge server 114 may be a server which operates in an edge environment. In various examples, edge server 114 may include one or more PCIe buses capable of hosting hardware accelerator 112.

Hardware accelerator 112 may be a hardware accelerator associated with edge server 114. For example, hardware accelerator 112 may be hosted on a PCIe bus of edge server 114. As described above, a hardware accelerator may refer to a piece of computer hardware designed to perform specific functions. Examples of hardware accelerators include smart network interface cards (SmartNICs), graphics processing units (GPUs), tensor processing units (TPUs), data processing units (DPUs), network accelerators, etc.

In general, hardware accelerators have smaller processing cores than computing units (i.e., CPUs) used in general-purpose computers such as servers. While hardware accelerators are generally cheaper than general-purpose computers, they have less compute capacity. Accordingly, hardware accelerator 112 may be cheaper, but less powerful than edge server 114. As a result, under typical workloads (i.e., non-spike workloads), hardware accelerator 112 may have longer service times than edge server 114 (as used herein service time may refer to the amount of time it takes a computing unit to respond to a query or other application specific workload). Accordingly, when edge-computing system 100 is operating under a normal workload (i.e., when service gateway 102 receives a typical rate of queries for the system), edge server 114 may serve all (or substantially all) of the queries received by service gateway 102. However, when edge-computing system 100 experiences a transient workload spike (i.e., when service gateway 102 receives a spike in queries) the service time for edge server 114 may increase beyond the service time of hardware accelerator 112.

To illustrate the concept, consider a simplified example involving two queries A and B. Under a typical workload load (i.e., non-spike workload), hardware accelerator 112 may take 4 and 7 seconds to serve queries A and B respectively. By contrast, under a typical workload, edge server 114 may take 1 and 5 seconds to serve queries A and B respectively. Accordingly, the overall service time for edge-computing system 100 is reduced if both queries are served by edge server 114. However, in an overloaded state (as it might enter during a transient workload spike), edge server 114 may take 3 and 8 seconds to serve queries A and B. Accordingly, during the spike query A should be distributed to edge server 114, and query B should be distributed to hardware accelerator 112 (this assumes that hardware accelerator 112 is not in an overloaded state).

Extending the illustration from above, edge-computing system 100 may have an SLA agreement that specifies that service time cannot exceed 7.5 seconds. Accordingly, in order to avoid an SLA violation during the transient workload spike, query B must be distributed to hardware accelerator 112. As will be described below, spike orchestration platform 120 may perform a version of the analysis described in the preceding paragraphs.

Spike orchestration platform 120 may be a software or hardware computing platform that manages the distribution of queries between edge server 114 and hardware accelerator 112. In certain examples, spike orchestration platform 120 may be implemented on any one or combination of edge server 114 and hardware accelerator 112. In other examples spike orchestration platform 120 may be implemented external to edge server 114 and hardware accelerator 112.

As will be described in greater detail in conjunction with FIG. 2, spike orchestration platform 120 may include (i) a traffic distribution module, (ii) a workload prediction module, and (iii) a spike orchestration module. Together, these modules may orchestrate the distribution of queries received by edge-computing system 100 in a manner which avoids SLA violations during transient workload spikes.

Figure 2:
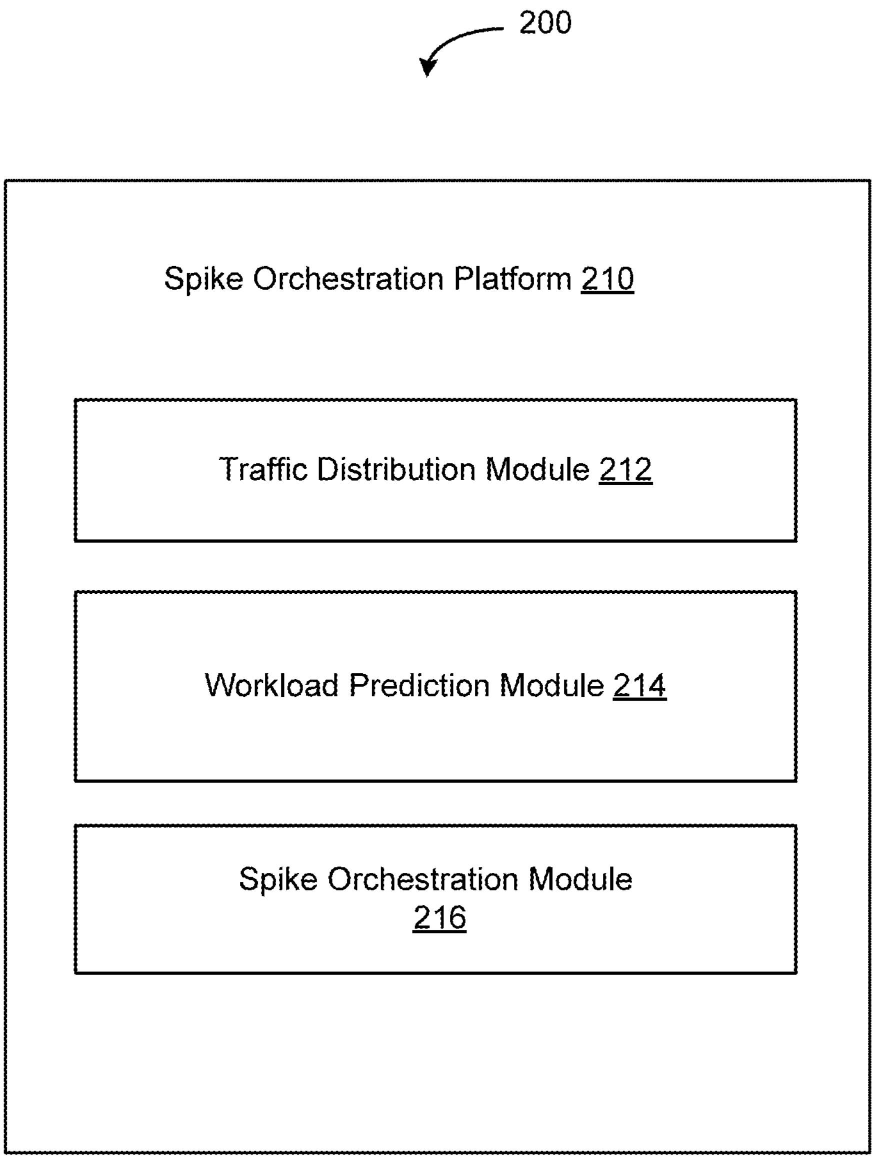
FIG. 2 depicts an example spike orchestration platform, in accordance with various examples of the presently disclosed technology.

FIG. 2 depicts an example spike orchestration platform 210 implemented as part of an edge-computing system 200, in accordance with various examples of the presently disclosed technology.

Edge-computing system 200 may comprise one or more edge servers and one or more hardware accelerators which serve queries received by edge-computing system 200. Collectively, the edge server(s) and hardware accelerator(s) may be referred to as the computing nodes of edge-computing system 200. In certain examples spike orchestration platform 210 may be implemented on the computing nodes of edge-computing system 200. In other examples spike orchestration platform 210 may be implemented external to the computing nodes of edge-computing system 200.

Spike orchestration platform 210 (which may be the same/similar as spike orchestration platform 120 of FIG. 1) may include a traffic distribution module 212, a workload prediction module 214, and a spike orchestration module 216. As described above, spike orchestration platform 210 may be used to orchestrate the distribution of received queries amongst the computing nodes of edge-computing system 200.

Traffic Distribution Module 212: Traffic distributing module 212 may distribute queries amongst the computing nodes of edge-computing system 200.

As described above, during normal (i.e., non-spike) workloads, traffic distributing module 212 may distribute all (or substantially all) of received queries to the edge server(s) of edge-computing system 200. As described above, edge servers are generally able to serve queries more quickly than hardware accelerators when operating under non-spike workloads. However, during (and sometimes in anticipation of) a transient workload spike, spike orchestration module 216 may direct traffic distribution module 212 to distribute a portion of received queries to the hardware accelerator(s) of edge-computing system 200.

In various examples, traffic distribution module 212 may utilize a heuristic approach to avoid distributing queries to computing nodes that have high service times due to transient workload spikes. In certain examples, this may involve using a queuing approach which distributes queries to computing nodes based on their respective service times. For example, assume that queries arrive at edge-computing system 200 with an arrival rate of $\lambda$ (queries per second). The service rate (which is 1/service time) for the edge-computing system 200's computing nodes may be represented by $\mu_i$ (queries per second). The queue at each computing node can be represented as M/M/1. Accordingly, an optimal traffic distribution that makes the sojourn time (i.e., waiting time) equal for each queue may be represented as follows:

$$\lambda_1 - \mu_1 = \lambda_2 - \mu_2$$

In other words, the optimal traffic distribution on N worker nodes may be represented as follows:

$$\lambda_i = u_i + \frac{\lambda_1 - \sum_{j=1}^{N} \mu_j}{N};\ i = 1, \ldots, N$$

i.e., the traffic distributor sends queries with an arrival rate of $\lambda_i$ (queries per second) to each worker node i, in the system.

Workload Predicting Module 214: Workload predicting module 214 (which will be described in greater detail in conjunction with FIG. 4) may be used to predict a future transient workload spike. In certain examples, workload prediction module 214 may use monitored historical data related to past queries received by edge-computing system 200 to make transient workload spike predictions.

Workload prediction module 214 may use any number of prediction models to predict future transient workload spikes. For example, workload prediction module 214 may utilize a vector regression (SVR) prediction model that predicts transient workload spikes based on past queries received by of edge-computing system 200. In another example, workload prediction module 214 may use deep learning models (e.g., deep neural networks) trained to make predictions based on historical observations.

In certain examples, the prediction model utilized by workload prediction module 214 may be based on past observations of workload over a window size of W time units. Workload prediction module 214 may change this time window size dynamically based on the workload variations over time. For example, it may increase the training window size if the workload variation over the current window is less than 10%, and decrease the training window size if the workload variation is more than 20%.

As will be described below, spike orchestration module 216 may utilize the predictions made by workload prediction module 216 to ensure that queries are distributed to computing nodes in a manner which avoids SLA violations during a transient workload spike.

Spike Orchestration Module 216: Spike orchestration module 216 may orchestrate a distribution of received queries amongst the computing nodes of edge-computing platform 200 in a manner which avoids SLA violations during transient workload spikes. As described above, this may involve directing (e.g., sending control signals to) traffic distribution module 212 to distribute a portion of queries to the hardware accelerator(s) of edge-computing system 200 during (and sometimes in anticipation of) the transient workload spike. By distributing a portion of queries to the hardware accelerator(s), spike orchestration platform 210 can ensure that the edge servers of the edge-computing platform 200 do not become overwhelmed/overloaded during the transient workload spike. As described above, when an edge server becomes overloaded, it's service time may increase dramatically, which can result in SLA violations for the edge-computing system.

In various examples, spike orchestration module 216 can leverage the predictions of workload predictor 214, along with monitored resource utilization metrics of the computing nodes of edge-computing platform 200, to make orchestrations.

Accordingly, in certain examples, spike orchestration module 216 may include a resource monitoring module. The resource monitoring module may periodically monitor resource utilization metrics for each computing node. As used here, a resource utilization metric may generally refer to a metric relating a computing node (e.g., an edge server, a hardware accelerator, and in examples involving containerized workloads, a container of an edge server/hardware accelerator) capable of measurement or observation. Non-limiting examples of resource utilization metric include QoS metrics (e.g., packet loss, bit rate, error rates, throughput, transmission delay, delay variation, availability, jitter, latency, and the like), an SLA metric (e.g., service time/query response time, service rate/query response rate, request inter arrival times, service availability, defect rates, security performance, data rates, throughput, jitter, mean time between failures, mean time to repair, mean time to recovery, and the like) or other application performance metrics (e.g., average service time/response time, error rates, count of application instances, request rate, application CPU/memory/bandwidth utilization, application availability, garbage collection, number of concurrent users, used/available resources, and the like).

In certain examples, spike orchestration module 216 may compare the resource utilization metrics for the computing nodes of edge-computing system 200 to corresponding threshold values for the resource utilization metrics. In some examples, these threshold values may correspond to SLA specifications.

For example, an SLA associated with edge-computing system 200 may specify that service time cannot exceed 7.5 seconds. Accordingly, spike orchestration module 216 can compare the monitored service times of each of the computing nodes of edge-computing system 200 against the threshold service time value of 7.5 seconds. If the service time for a computing node begins to approach 7.5 seconds, spike orchestration module 216 may ensure that queries/workloads are re-distributed to the other computing nodes of edge-computing system 200 to avoid an SLA violation. In the same/similar fashion, spike orchestration module 216 can simultaneously compare other monitored resource utilization metrics (e.g., error rates, service availability, etc.) against corresponding SLA specifications to ensure that queries/workloads are distributed to avoid SLA violations.

In some examples, spike orchestration module 216 can predict/anticipate resource utilization metrics for the computing nodes of edge-computing platform 200 for a transient workload spike. Spike orchestration module 216 may base these predictions on monitored resource utilization metrics and transient workload spike predictions. In various examples, workload prediction module 214 may predict/anticipate resource utilization metrics instead of (or in addition to) spike orchestration module 216.

For concept illustration, consider that the computing nodes of edge-computing system 200 are tasked with serving queries $A_1 \ldots A_N$ which require approximately the same amount of compute power to serve (in other words, at a given workload, the service time for each query should be approximately the same). In this simplified example, the computing nodes of edge-computing system 200 may comprise a single edge server and one or more hardware accelerators. Under non-spike workloads, the single edge server of edge-computing system 200 may serve all or substantially all of queries $A_1 \ldots A_N$. At a given time, $t_1$, the rate at which edge-computing system 200 receives queries may be $x_1$ (here, the rate at which edge-computing system 200 receives queries can serve as a proxy for workload). Serving all received queries at time $t_1$, the edge server may have a CPU utilization of $y_1$ (here, CPU utilization for a given computing node may serve as a proxy for the workload the computing node is under). At the CPU utilization of $y_1$, the edge server may have a service rate of 0.3 seconds. As described above, spike orchestration module 216 may monitor all of the resource utilization metrics described in the present paragraph.

Spike orchestration module 216 may then obtain a prediction from workload prediction module 214 that there will be a transient workload spike at a time $t_2$. In particular, workload prediction module 214 may predict that at time $t_2$, the rate at which edge-computing system 200 receives queries may jump to $5x_1$ (i.e., 5 times $x_1$). Based on known mapping or learned analytics, spike orchestration module 216 may predict that the edge-server's CPU utilization will jump to $6.5y_1$ if it continues to handle all queries during the transient workload spike. Based on this information, spike orchestration module 216 may predict that at a CPU utilization of $6.5y_1$, the edge server's service time for queries $A_1 \ldots A_N$ will surge to 2 seconds. In other words, spike orchestration module 216 may predict that service time of the edge server will increase to 2 seconds during the predicted transient workload spike unless a portion of received queries are distributed to the hardware accelerators of edge-computing system 200. A service time of 2 seconds may violate an SLA which specifies that service times are not to exceed 1.5 seconds.

However, by distributing a portion of received queries to other computing nodes during (and sometimes prior to) the predicted transient workload spike, spike orchestration module 216 may reduce the rate at which the edge server receives queries, and by extension its CPU utilization. At this reduced CPU utilization, the edge server's service time for queries $A_1 \ldots A_N$ may drop to a value much closer to 0.3 seconds. Moreover, spike orchestration module 216 can orchestrate the "overflow" queries amongst multiple hardware accelerators to ensure that none of the hardware accelerators reach a CPU utilization at which their service times exceed 2 seconds. Here, even if the service times for the hardware accelerators are relatively high (e.g., 1.1 seconds) compared to the service time of the edge server under non-spike workloads (i.e., 0.3 seconds), it is not of major concern because, by definition, the transient workload will only last for a short time. Accordingly, the hardware accelerators and their relatively higher service times will only be used for short bursts, and not impact client experience significantly.

Figure 3:
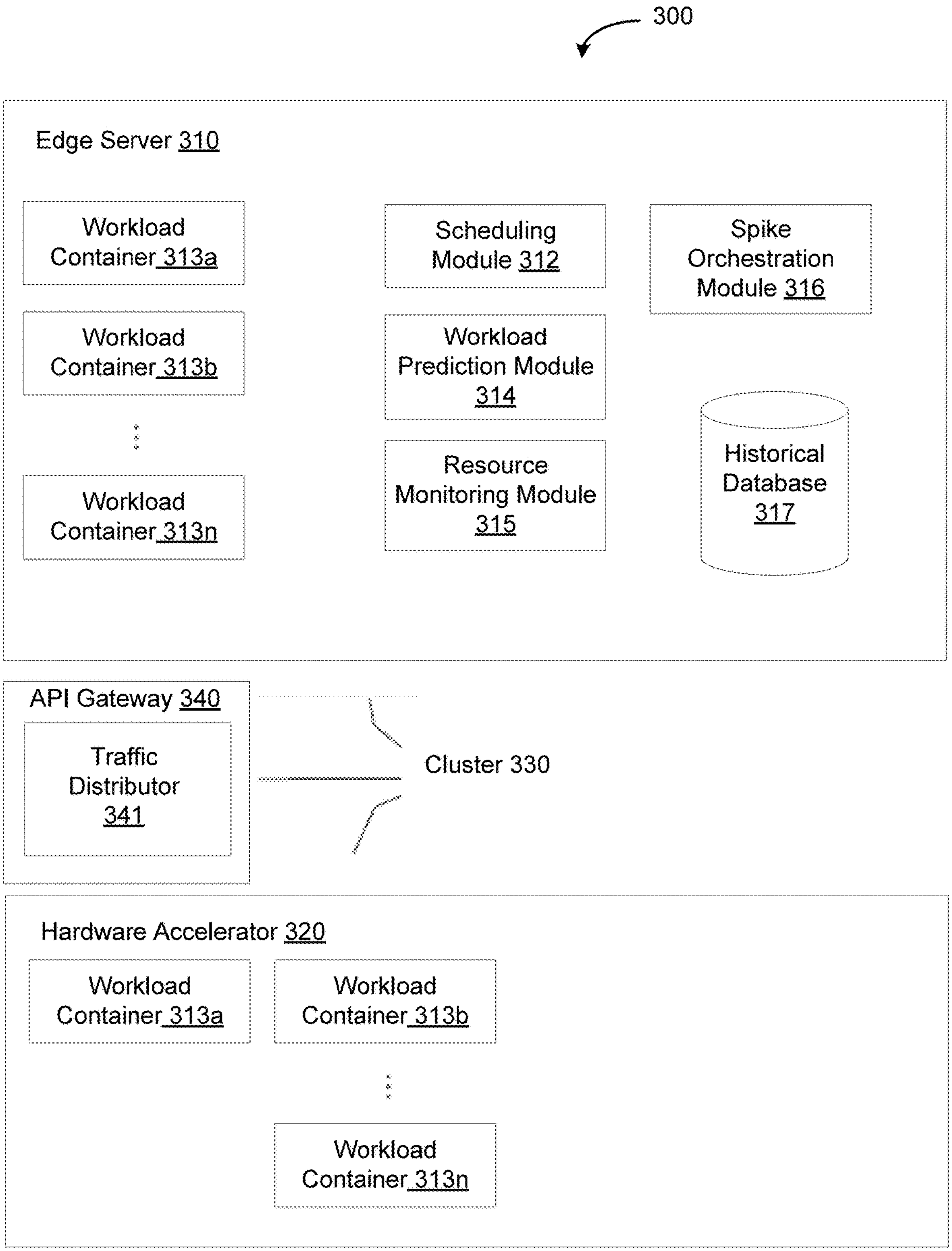
FIG. 3 depicts an example edge-computing system implemented in a containerized environment, in accordance with various examples of the presently disclosed technology.

FIG. 3 is a block diagram conceptually depicting various functional units of an edge-computing system 300 in which a heterogeneous cluster (e.g., cluster 330) of a spike orchestration platform may be distributed across an edge server (e.g., edge server 310) and a hardware accelerator (e.g., hardware accelerator 320) in accordance with various examples of the presently disclosed technology. As described above, FIG. 3 illustrates an example of how a spike orchestration platform (such as the spike orchestration platforms described in conjunction with FIGS. 1 and 2), can be implemented in a containerized work environment.

Containers are technology used to bundle an application with all its necessary files into one runtime environment. Containerized workload platforms such as Kubernetes and Docker can facilitate the management of containerized applications.

Accordingly, the spike orchestration platform of FIG. 3 may utilize any available containerized workload platforms including, but not limited to K8s, K3s, KubeEdge, Docker and the like.

In the context of the present example, cluster 330 (e.g., a Kubernetes cluster), includes workload containers 313*a-n* within edge server 310 and workload containers 323*a-n* within hardware accelerator 320. While the workload containers of cluster 330 are distributed across one edge server and one hardware accelerator in the present example, the workload containers of cluster 330 may be distributed across one or more edge servers and one or more hardware accelerators.

Here, cluster 330 may be referred to as heterogeneous because its various workload containers may have different compute capacities. In particular, the workload containers of hardware accelerator 320 may have smaller compute capacities than the workload containers of edge server 310. As described above, this may be because edge server 310 includes a larger processing core than hardware accelerator 320.

Cluster 330 may also include an Application Programming Interface (API) gateway 340 representing an entry point to the cluster 330. The API gateway 340 may implement an API (e.g., a Representational State Transfer (REST) API over Hypertext Transfer Protocol (HTTP)). Queries originated by clients (not shown) may first arrive at the API gateway 340 in the form of HTTP requests invoking methods of the API, for example, corresponding to various serverless functions implemented within the cluster 330.

In certain examples, a traffic distributor 341 may run on API gateway 340. Here, traffic distributor 341 may perform the same/similar functions as the traffic distributor modules described in conjunction with FIGS. 1 and 2. In particular, traffic distributor 341 may distribute queries received at API gateway 340 amongst the workload containers of cluster 330 according to their computational power. As described above, this may involve distributing queries to the workload containers of edge server 310 during non-spike workloads. However, during (and sometimes in anticipation) of a transient workload spike, traffic distributor 341 may distribute a portion of queries to the workload containers of hardware accelerator 320. In various examples, the received queries may be specific to an application.

In the example of FIG. 3, edge server 310 also includes various modules which comprise a spike orchestration platform. In particular, edge server 310 includes a scheduling module 312, a workload prediction module 314, a resource monitoring module 315, and a spike orchestration module 316. Edge Server 310 also includes a historical database 317. In various examples resource monitoring module 315 may provide information (which in certain examples may be application specific) to historical database 317 where it may be utilized by workload prediction module 314 and spike orchestration module 316 to make predictions. As described above, the various modules of a spike orchestration platform may be implemented on the edge server(s) and hardware accelerator(s) of an edge-computing system. Accordingly, the modules depicted within edge server 310 may also be implemented in hardware accelerator 320.

Here, workload prediction module 314, resource monitoring module 315, and spike orchestration module 316 may be the same/similar as their corresponding modules described in conjunction with FIGS. 1-2.

Scheduling module 312 may schedule queries/workloads for the various workload containers of cluster 330 using a queue-based approach. As described above, in anticipation of a transient workload spike predicted by workload prediction module 314, spike orchestration module 316 may determine a distribution of queries which avoids an SLA violation during the predicted transient workload spike. Once determined, executing this distribution may require queueing queries at workload containers before they are served/processed. Accordingly, scheduling module 312 may assist by scheduling such queues.

In various examples spike orchestration module 316 may mitigate the impact of cold-start latency by starting new workload containers before a transient workload spike arrives.

Cold-start latency may refer to a phenomenon where an idle workload container (i.e. a workload container which has not been used for an extended period of time) takes longer to serve/process an initial subset of workloads (e.g., serverless functions) it receives. Conceptually, this is similar to "cold-starting" an internal combustion engine. Both the workload container and internal combustion engine will not operate at peak performance until they have "warmed up" by running under load. One way to mitigate the impact of cold-start latency is to keep launched containers "warmed" for future workloads/function invocations. However, warming containers during idle time can waste valuable computing resources.

In examples of the presently disclosed technology, the issue of cold-start latency can arise when queries are first distributed to workload containers residing in hardware accelerator 320. As described above, in certain examples, the workload containers of edge server 310 may serve all (or substantially all) of the queries received by cluster 330 for non-spike workloads. Assuming that transient workload spikes are relatively infrequent, this may mean that the workload containers of hardware accelerator 320 are not performing functions (i.e., serving queries) for substantial stretches of time. In other words, they may become cold. Accordingly, without adequate foresight, queries may be first distributed to workload containers of hardware accelerator 320 during a transient workload spike, before they have had a chance to "warm up." Accordingly, the service/response times of the workload containers may be abnormally high to start. This problem can be particularly acute where by design the workload containers of hardware accelerator 320 only serve queries for a very short time (i.e. during transient workload spikes).

However, as described above, workload prediction module 314 and spike orchestration module 316 may work in concert to (1) predict future transient workload spikes before they happen; and (2) start (i.e., "warm-up") workload containers of hardware accelerator 320 before the transient workload spike arrives. In this way, cold-start latency may be mitigated during the transient workload spike itself (i.e. the period of time when the computing resources of cluster 330 are under the most strain).

Figure 4:
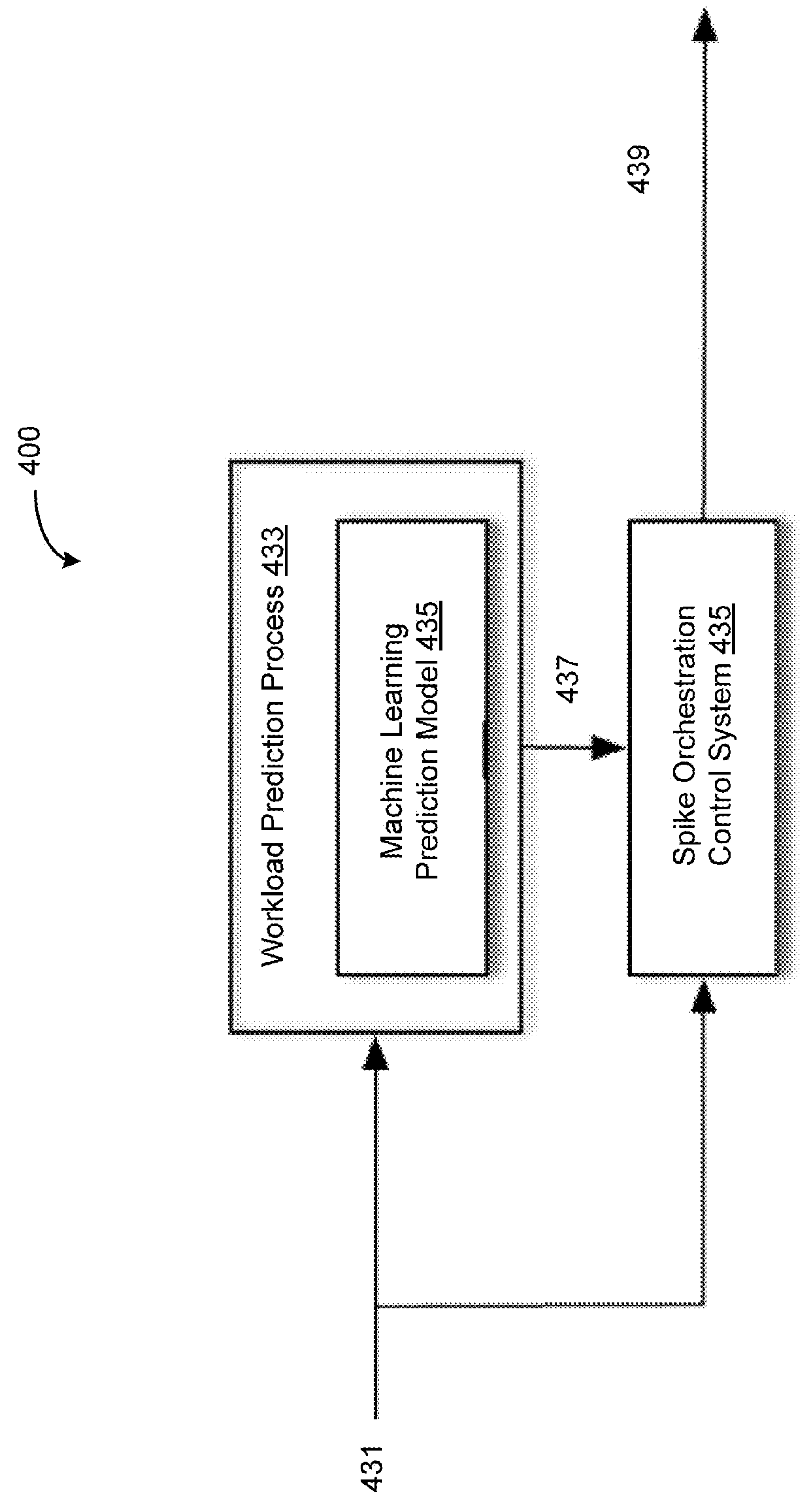
FIG. 4 is a block diagram illustrating interactions between a workload prediction process and a spike orchestration control system, in accordance with various examples of the presently disclosed technology.

FIG. 4 is a block diagram illustrating interactions between a workload prediction process 433 and a spike orchestration control system 438, in accordance with various examples of the presently disclosed technology. Workload prediction process 433 and spike orchestration control system 438 may be implemented as part of an edge-computing system 400.

Workload prediction process 433 is a non-limiting example of the workload prediction modules of the previous figures. Depending upon the particular implementation, workload prediction process 433 may be performed on an edge server or one of the hardware accelerators of edge-computing system 400. In general, workload prediction process 433 performs an estimation of future workload which spike orchestration control system 438 can use to orchestrate distribution of queries during (and sometimes in anticipation of) a transient workload spike. Accordingly, the output of workload prediction process 433 may be a control signal (439) sent by spike orchestration control system 438 with instructions to distribute a portion of received queries to hardware accelerator(s) of edge-computing system 400.

In certain examples, spike orchestration control system 438 may be a feedback control system that determines an optimal distribution of queries which allows edge-computing system 400 to handle an estimated future transient workload spike while avoiding SLA violations. Spike orchestration control system 438 may determine this optimal distribution of queries based on the amount of resources expected to be consumed by the future transient workload spike and the computing capabilities of the computing nodes.

In some examples, a proactive control-theory based approach may be employed in which a prediction model (e.g., machine learning prediction model 435) facilitates handling of fluctuating workloads and resource utilizations. Inputs 431 to workload prediction process 433 may include one or more of a target resource utilization metric value, past query history and past values of resource utilization metrics corresponding to the past query history. An output 437 of the workload prediction process 433 may be in the form of a number of future queries estimated to be received at or by a future time. The output 437 can then be used as an input to spike orchestration control system 438 to determine an output 439. Output 439 may be a control signal with instructions to distribute a portion of queries to the hardware accelerator(s) of edge-computing system 400 during (and sometimes in anticipation of) a predicted transient workload spike.

In various examples, spike orchestration control system 438 may include a controller which is part of a feedback control loop. Non-limiting examples of the controller include a proportional-integral-derivative (PID) controller and a proportional integral (PI) controller. A PI controller is a special case of a PID controller in which the derivative of the error is not used.

Machine-learning prediction model 435 may utilize various machine-learning techniques to predict a transient workload spike ahead of time. These techniques may include as non-limiting examples, support vector regression (SVR) models and deep learning models which can be trained to make predictions based on historical observations. In a serverless framework, since any delay in the prediction phase can impact performance as it adds more delay to container startup latency, prediction time may be a factor to be considered in selecting an appropriate machine-learning prediction model. As empirical data suggests SVR models to be the most accurate of machine learning algorithms for the purpose of predicting cloud workloads (due in part to training and prediction overhead of DNNs), various examples provided herein are described with reference to the use of SVR models. According to one example, a radial basis function (RBF) SVR kernel can be used to train the machine-learning prediction model 435 to predict transient workload spikes. In other examples, various other SVR kernels may be used including, but not limited to, linear, polynomial, and sigmoid SVR kernels.

Figure 5:
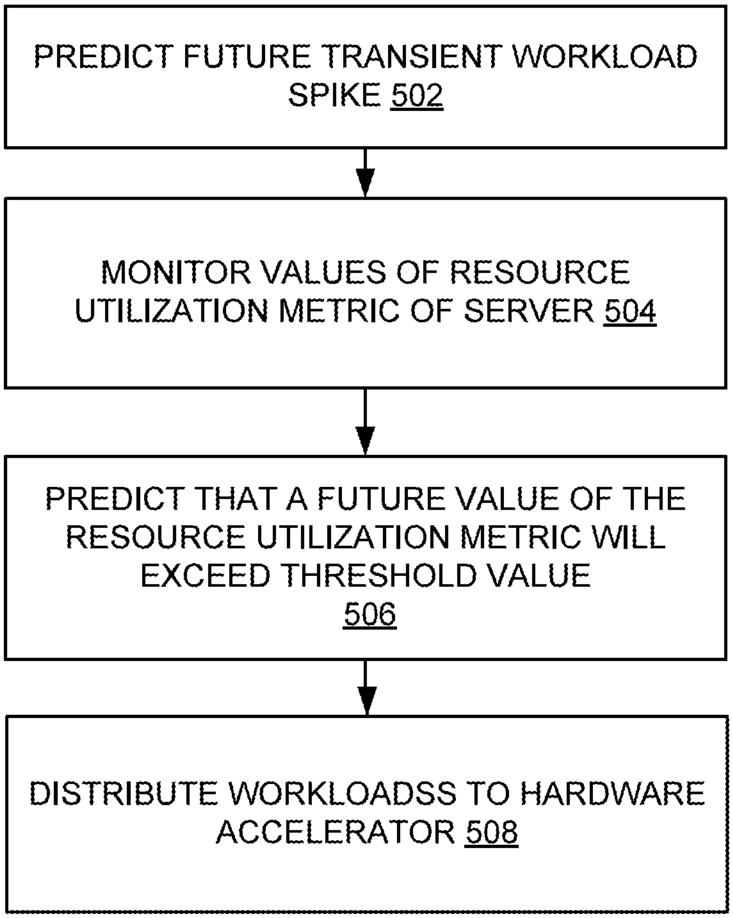
FIG. 5 is an example flowchart illustrating example operations that can be performed by a spike orchestration platform to distribute workloads among the computing nodes of a computing system during a transient workload spike, in accordance with various examples.
Figure 6:
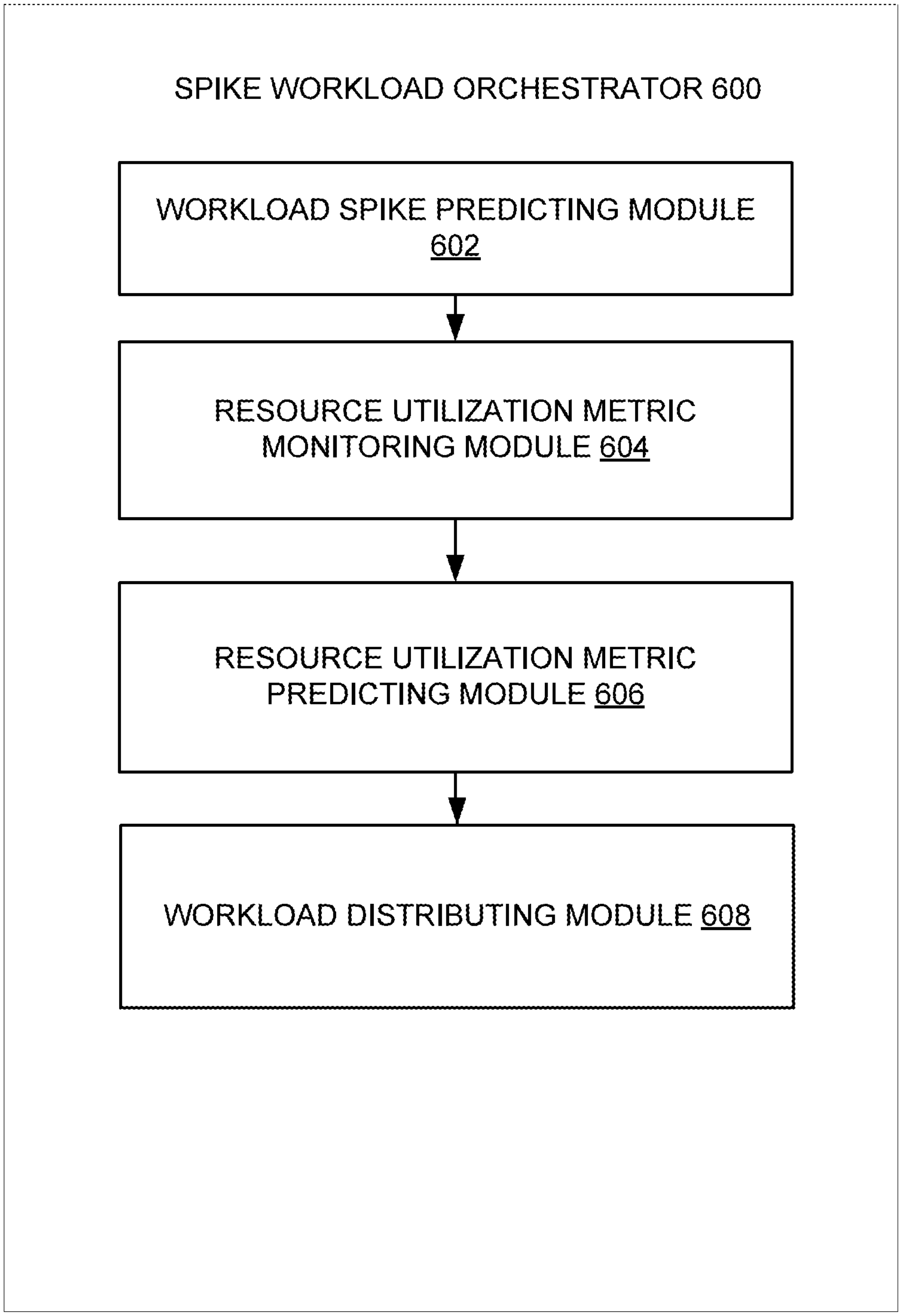
FIG. 6 is an example system diagram illustrating components of the spike orchestration platform of FIG. 5, in accordance with various examples.

FIG. 5 is an example flowchart illustrating example operations that can be performed by a spike orchestration platform to distribute workloads among the computing nodes of a computing system during a transient workload spike, in accordance with various examples. In certain examples the spike orchestration platform may be implemented on the computing system, but in other examples the spike orchestration platform may be implemented external to the computing system. As a companion to FIG. 5, FIG. 6 is an example system diagram illustrating components of spike workload orchestrator 600, in accordance with various examples.

At step 502, the spike orchestration platform may predict a transient workload spike based on monitored historical data regarding past workloads received by the computing system. In various examples, step 502 may be performed by workload spike predicting module 602 of spike workload orchestrator 600.

The computing system may include a server and a hardware accelerator. In various examples, the computing system may include more than one server and/or more than one hardware accelerator. In certain examples the server may include one or more PCIe buses capable of hosting the hardware accelerator.

As described above, the server may be an edge server which operates in an edge computing environment (likewise the computing system may be an edge-computing system). However, a person of ordinary skill in the art would understand that the techniques described above may be applied generally to computing systems/servers which operate outside of an edge environment.

The hardware accelerator may be a hardware accelerator associated with the server. For example, the hardware accelerator may be hosted on a PCIe bus of the edge server.

As described above, a hardware accelerator may refer to a piece of computer hardware designed to perform specific functions. Examples of hardware accelerators include smart network interface cards (SmartNICs), graphics processing units (GPUs), tensor processing units (TPUs), data processing units (DPUs), network accelerators, etc. Where the hardware accelerator is a SmartNIC, it may be various types of SmartNIC (e.g., a System on a Chip based SmartNIC, an ASIC-based SmartNIC, an FPGA-based SmartNIC, etc.).

A transient workload spike may refer to short-lived burst in demand for the computing resources of the computing system. As alluded to above, these demands may take the form of received workloads. Where the computing system operates in an edge environment, these workloads may comprise serverless client queries.

The spike orchestration platform may predict the transient workload spike based on the monitored historical data regarding past workloads in any of the ways described above. For example, the spike orchestration platform may utilize a support vector regression (SVR) prediction model.

As described above, in certain examples the monitored historical data regarding past workloads may be application specific. In another words, the computing system may receive a subset of workloads for a given application. The workloads for the given application may be somewhat consistent. Accordingly, by using application-specific historical information, the spike orchestration platform may be able to tune its prediction of the transient workload spike more precisely. For example, the spike orchestration platform may be able to more precisely predict the time the transient workload spike will arise, and the magnitude of the spike (e.g. an arrival rate of workloads in workloads per second).

At step 504, the spike orchestration platform may monitor values of a resource utilization metric of the server. In various examples, step 504 may be performed by the resource utilization metric monitoring module 604 of spike workload orchestrator 600.

In general, a spike orchestration platform may periodically monitor resource utilization metrics for each computing node of a computing system. Here the spike orchestration platform may periodically monitor one or more resource utilization metrics for the server, as well as the hardware accelerator.

A resource utilization metric may generally refer to a metric relating to a computing node (e.g., a server, a hardware accelerator, and in examples involving containerized workloads, a container of an server/hardware accelerator) capable of measurement or observation. Non-limiting examples of resource utilization metric include QoS metrics (e.g., packet loss, bit rate, error rates, throughput, transmission delay, delay variation, availability, jitter, latency, and the like), an SLA metric (e.g., service time/workload response time, service rate/workload response rate, request inter arrival times, service availability, defect rates, security performance, data rates, throughput, jitter, mean time between failures, mean time to repair, mean time to recovery, and the like) or other application performance metrics (e.g., average service time/response time, error rates, count of application instances, request rate, application CPU/memory/bandwidth utilization, application availability, garbage collection, number of concurrent users, used/available resources, and the like).

As described above, the spike orchestration platform may monitor values of the resource utilization metric of the server to avoid SLA violations. For example, a particular SLA may specify that the service time for an application A cannot exceed 1.5 seconds. Accordingly, if the spike orchestration platform detects that the service time of the server is approaching 1.5 seconds, the spike orchestration platform may distribute one or more workloads to the hardware accelerator in order to dampen the spike.

As will be described below, the spike orchestration platform may also use the monitored values of the resource utilization metric to make predictions about values of the resource utilization metric.

Accordingly, at step 506, the spike orchestration platform may predict that a value of the resource utilization metric will exceed a threshold value for the resource utilization metric at some time prior to or during the predicted transient workload spike unless one or more workloads are distributed to the hardware accelerator. In various examples, step 506 may be performed by the resource utilization metric predicting module 606 of spike workload orchestrator 600.

As described in conjunction with FIG. 2, the spike orchestration platform can predict/anticipate resource utilization metric values for a transient workload spike. The spike orchestration platform may base these predictions on monitored resource utilization metric values and the transient workload spike prediction.

For example, the spike orchestration platform may predict there will be a transient workload spike at a time $t_2$. Based on known mapping or learned analytics, the spike orchestration platform may predict that the server's CPU utilization will jump 5-fold if it continues to handle all workloads during the transient workload spike. Based on this information, the spike orchestration module may predict that the server's service time will surge to 2 seconds. In other words, the spike orchestration platform may predict that the server's service time will increase to 2 seconds unless one or more received workloads are distributed to the hardware accelerator. Here, a service time of 2 seconds may exceed a threshold service time value of 1.5 seconds. As described above, in certain examples the threshold service time may correspond to an SLA specification.

However, by distributing one or more received workloads to the hardware accelerator during (and sometimes prior to) the predicted transient workload spike, the spike orchestration platform may reduce the rate at which the server receives workloads, and by extension its CPU utilization. At this reduced CPU utilization, the server's service time may drop to a value closer to 0.3 seconds. Moreover, the spike orchestration platform can orchestrate the "overflow" workloads to more than one hardware accelerator to ensure that none of the hardware accelerators reach a CPU utilization at which their service times for serving workloads exceeds 2 seconds.

Based on the prediction at step 506, at step 508, the spike orchestration platform may distribute one or more workloads to the hardware accelerator for execution. The spike orchestration platform may distribute the one or more workloads using any of the approaches described in conjunction with FIGS. 1-4. In various examples, step 508 may be performed by the workload distributing module 608 of spike workload orchestrator 600.

As described in conjunction with FIG. 3, in certain examples the computing system may be implemented in a containerized work environment. Here, the computing system may utilize any available containerized workload platform including, but not limited to, K8s, K3s, KubeEdge, Docker and the like. Accordingly, workload containers may be distributed across the server and the hardware accelerator. The workload containers may execute the workloads they receive. In certain examples, the spike orchestration platform may start a workload container of the hardware accelerator before a transient workload spike arrives. As described in conjunction with FIG. 3, by starting the workload container ahead of time, the effects of cold start latency may be mitigated during the transient workload spike.

Figure 7:
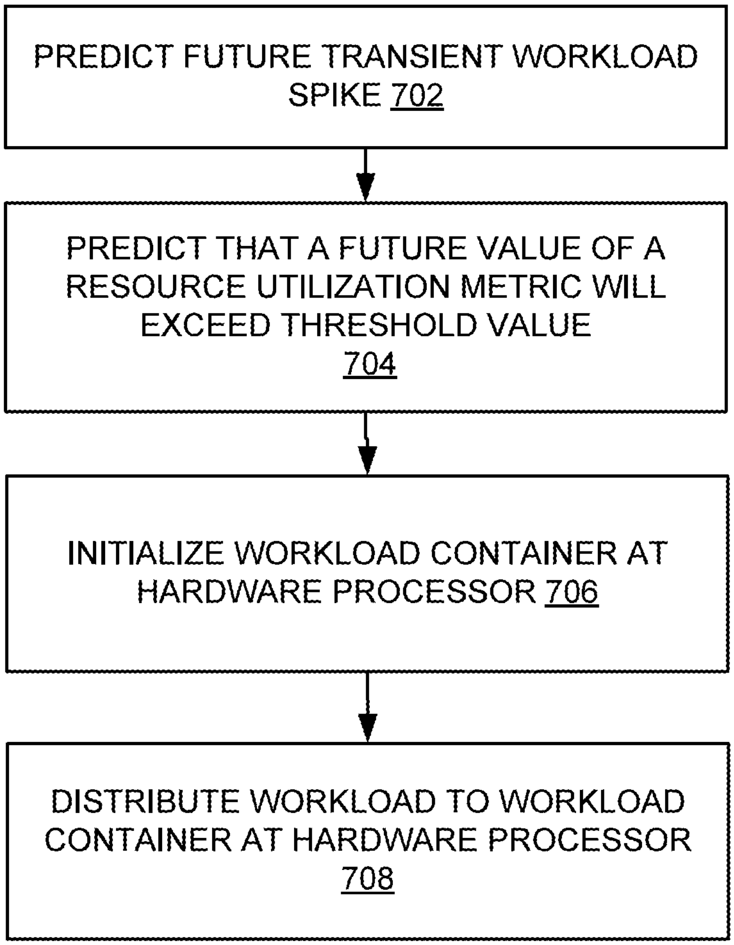
FIG. 7 is another example flowchart illustrating example operations that can be performed by a spike orchestration platform to distribute workloads among the computing nodes of a computing system during a transient workload spike, in accordance with various examples.
Figure 8:
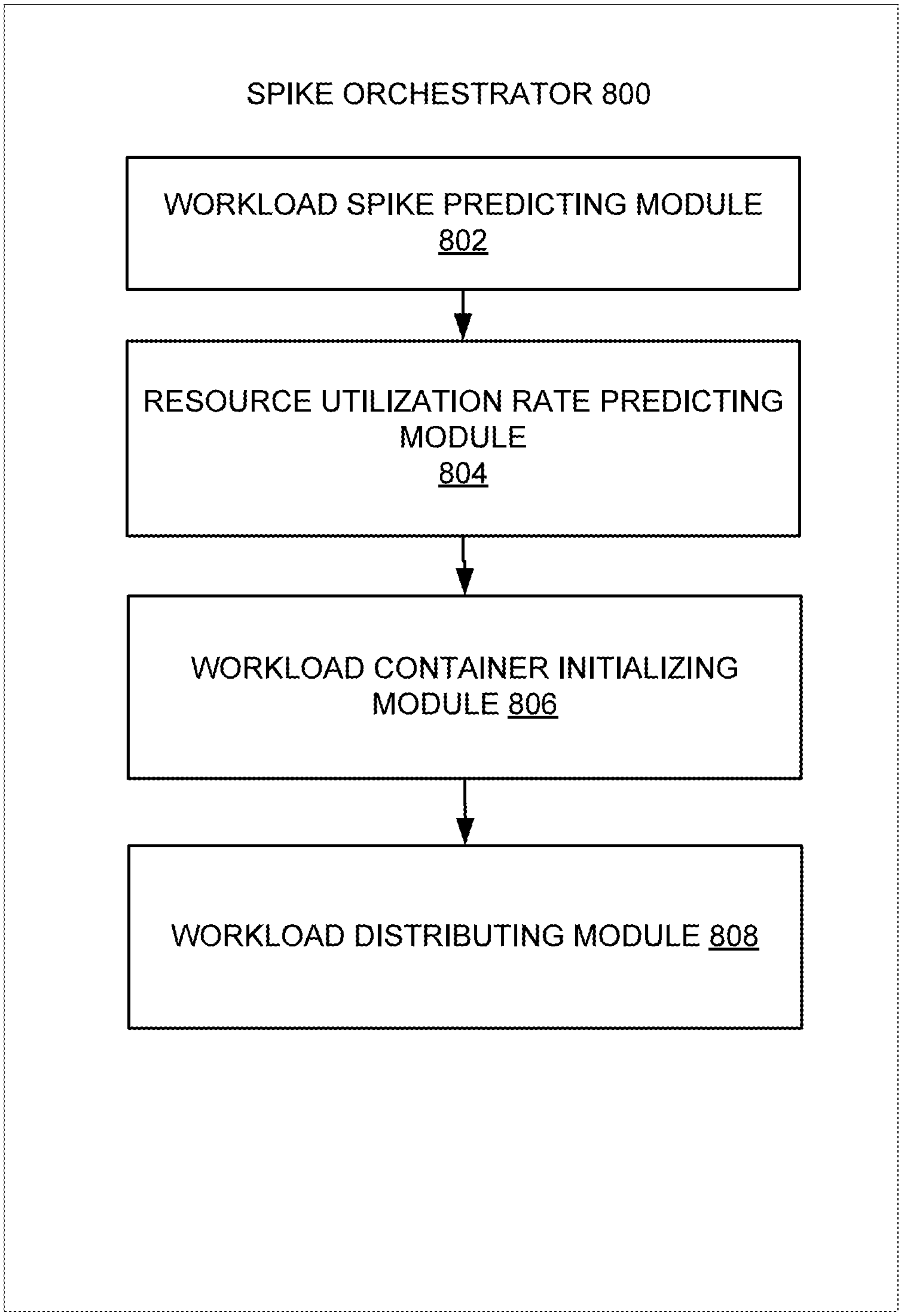
FIG. 8 is an example system diagram illustrating components of the spike orchestration platform of FIG. 7, in accordance with various examples.

FIG. 7 is another example flowchart illustrating example operations that can be performed by a spike orchestration platform to distribute workloads among the computing nodes of a computing system during a transient workload spike, in accordance with various examples. As a companion to FIG. 7, FIG. 8 is an example system diagram illustrating components of spike workload orchestrator 800, in accordance with various examples.

At step 702, the spike orchestration platform may predict a transient workload spike based on monitored historical data regarding past workloads received by the computing system. This step may be performed in the same/similar manner as step 502 of FIG. 5. In various examples, step 702 may be performed by workload spike predicting module 802 of spike workload orchestrator 800.

At step 704, the spike orchestration platform may predict that a value of a resource utilization metric of the computing system will exceed a threshold value of the resource utilization metric at some time prior to or during the predicted transient workload spike unless one or more workloads are distributed to the hardware accelerator. This step may be performed in the same/similar manner as step 506 of FIG. 5.

In various examples, step 704 may be performed the resource utilization metric predicting module 804 of spike workload orchestrator 800.

At step 706, the spike orchestration platform may start a workload container at the hardware accelerator prior to the predicted transient workload spike. In various examples, step 706 may be performed by the workload starting module 806 of spike workload orchestrator 800.

As described above, the computing system may be implemented in a containerized work environment. Accordingly, the spike orchestration platform may starting the workload container before the arrival of the transient workload spike in order to mitigate the effects of cold start latency.

At step 708, the spike orchestration platform may distribute a workload to the workload container at the hardware accelerator for execution after starting the workload container. This step may be performed in the same/similar manner as step 508 of FIG. 5. In various examples, step 708 may be performed by the workload distributing module 808 of spike workload orchestrator 800.

Figure 9:
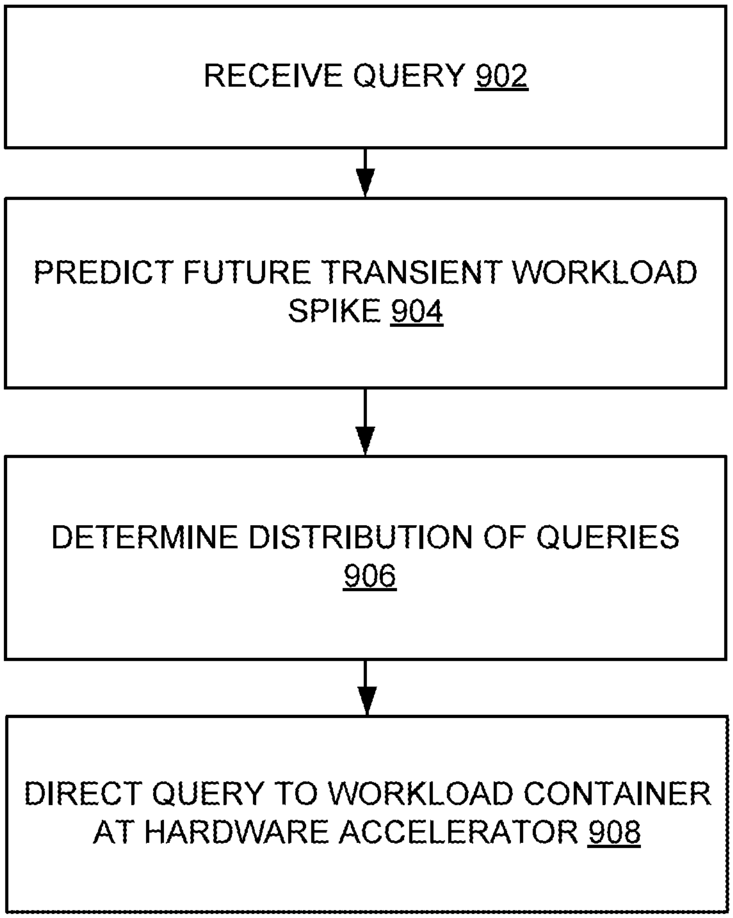
FIG. 9 is another example flowchart illustrating example operations that can be performed by a spike orchestration platform to distribute queries among the computing nodes of an edge-computing system during a transient workload spike, in accordance with various examples.
Figure 10:
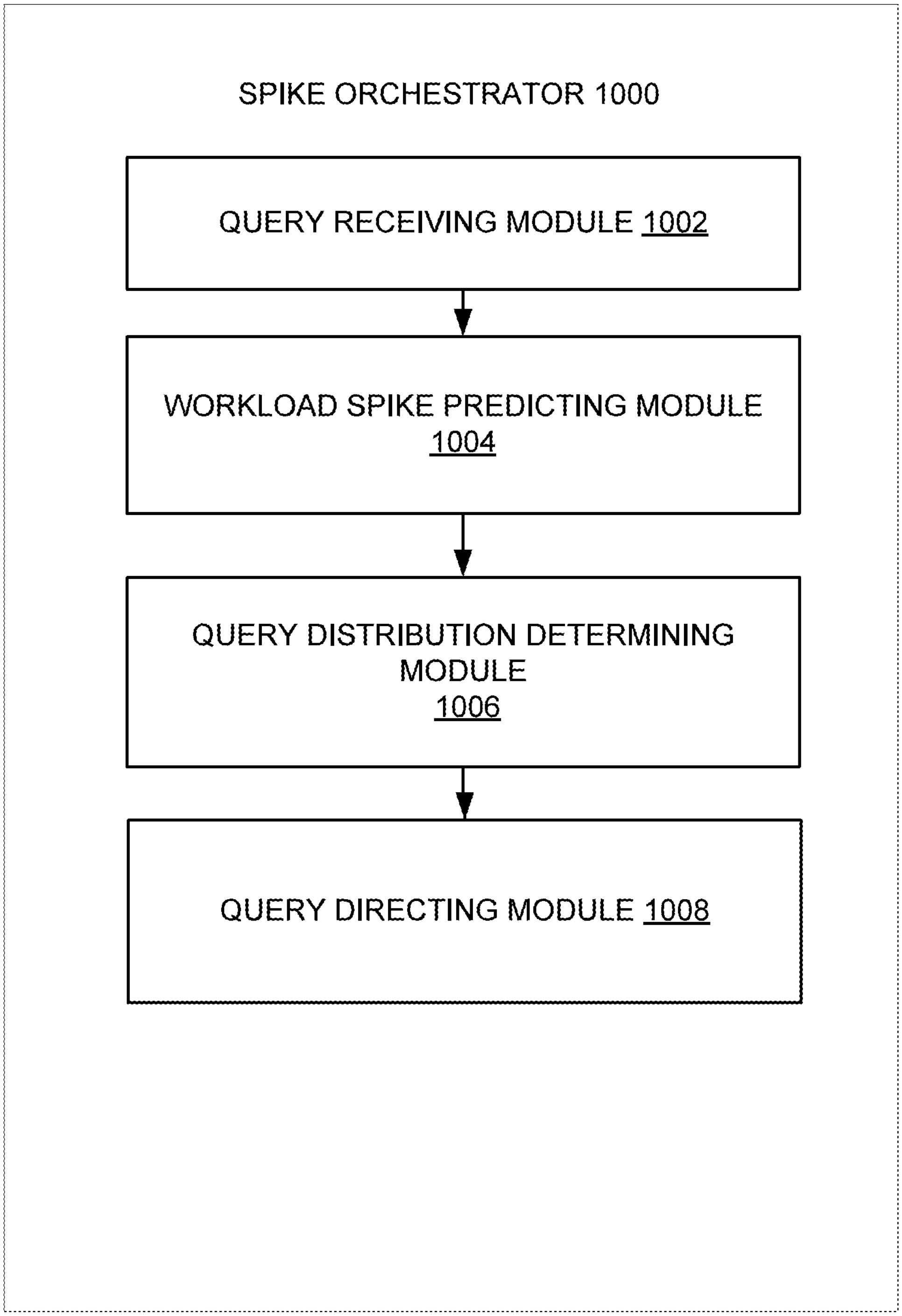
FIG. 10 is an example system diagram illustrating components of the spike orchestration platform of FIG. 9, in accordance with various examples.

FIG. 9 is another example flowchart illustrating example operations that can be performed by a spike orchestration platform to distribute queries among the computing nodes of an edge-computing system during a transient workload spike, in accordance with various examples. As a companion to FIG. 9, FIG. 10 is an example system diagram illustrating components of spike workload orchestrator 1000, in accordance with various examples.

At step 902, the spike orchestration platform may receive a query from an Application Programming Interface (API) gateway of the edge-computing system (as used herein, a query, or serverless query may refer to the specific type of workload handled by an edge-computing system). In various examples, step 902 may be performed by a query receiving module 1002 of spike workload orchestrator 1000.

As described above, where the edge-computing system is implemented as a containerized work environment, an API gateway may represent an entry point to the edge-computing system. The API gateway may implement an API (e.g., a Representational State Transfer (REST) API over Hypertext Transfer Protocol (HTTP)). Queries originated by clients may first arrive at the API gateway in the form of HTTP requests invoking methods of the API, for example, corresponding to various serverless functions implemented within the edge-computing system.

In certain examples, a traffic distributor may run on the API gateway Here, the traffic distributor may perform the same/similar functions as the traffic distributor modules described in conjunction with FIGS. 1 and 2. In particular, the traffic distributor may distribute queries received at API gateway amongst the workload containers of the edge-computing system. As described above, this may involve distributing queries to the workload containers of the edge server during non-spike workloads. However, during (and sometimes in anticipation) of a transient workload spike, the traffic distributor may distribute a portion of queries to the workload containers of the hardware accelerator.

At step 904, the spike orchestration platform may predict a transient workload spike. This step may be performed in the same/similar manner as steps 502 and 702 of FIGS. 5 and 7 respectively. In various examples, step 904 may be performed by the workload spike predicting module 1004 of spike workload orchestrator 1000.

At step 906, the spike orchestration platform may determine a distribution of queries over a time horizon which includes the predicted transient workload spike. In various examples, step 906 may be performed by the query distribution determining module 1006 of spike workload orchestrator 1000.

As described above, the spike orchestration platform may utilize an approach which involves scheduling/queuing workloads for the edge server and hardware accelerator ahead of time. Accordingly, the spike orchestration platform may determine a distribution of queries between the edge server and hardware accelerator over a particular time horizon. This time horizon may include the transient workload spike predicted in the previous step.

As described above, the spike orchestration platform may leverage workload predictions and monitored resource utilization values to predict resource utilization values. For example, the spike orchestration platform may predict service times for the edge server and hardware accelerator respectively. The spike orchestration platform can also predict service times for a contemplated distribution of queries for the time horizon which includes the predicted transient workload spike. In other words, the spike orchestration platform can calculate that the service times for the edge server and hardware accelerator will not exceed a threshold service time, during the time horizon. Accordingly, the spike orchestration ensure that platform can the determined/contemplated distribution of queries avoids negative outcomes such as SLA violations (which may be associated with the threshold service time).

At step 908, the spike orchestration platform may direct the query to a workload container at the hardware accelerator for execution. This step may be performed in the same/similar manner as step 708 of FIG. 7. In various examples, step 908 may be performed by the query distributing module 1008 of spike workload orchestrator 800.

Figure 11:
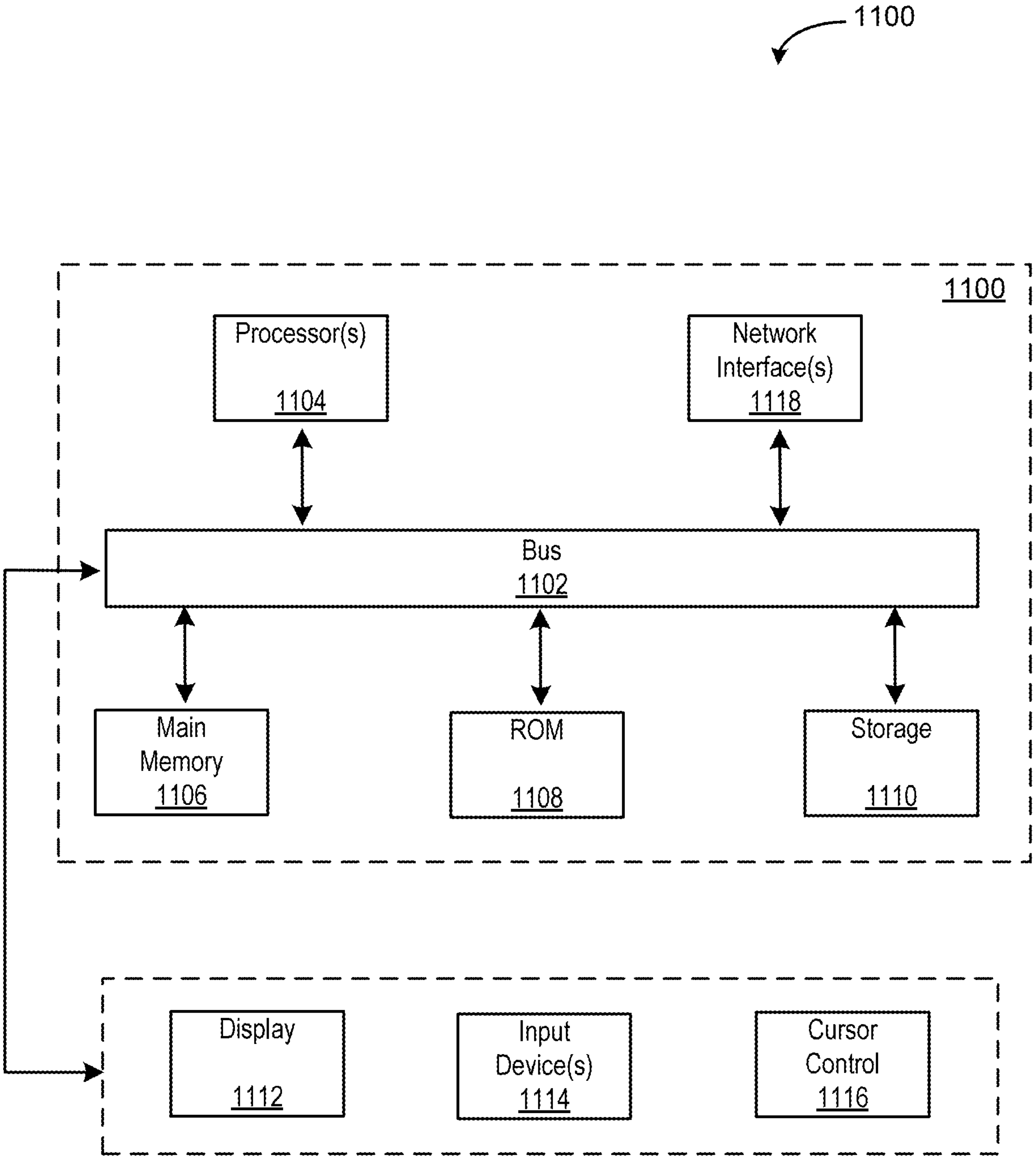
FIG. 11 is an example computing component that may be used to implement various features of embodiments described in the present disclosure.

FIG. 11 depicts a block diagram of an example computer system 1100 in which various of the embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random-access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAS, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Network interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, network interface 1118 may be a local area network (LAN) card to provide a data communication connection to a compatible LAN (or WAN component to communicated with a WAN). Wireless links may also be implemented. In any such implementation, network interface 1118 sends and receives electrical, electromagnetic, or optical signals that carry digital data streams representing various types of information.

A network link typically provides data communication through one or more networks to other data devices. For example, a network link may provide a connection through local network to an edge computer or to data equipment operated by an Internet Service Provider (ISP). The ISP in turn provides data communication services through the worldwide packet data communication network now commonly referred to as the "Internet." Local network and Internet both use electrical, electromagnetic, or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network, and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

What is claimed is:

1. A method comprising:

predicting a transient workload spike based on monitored historical data regarding past workloads received by a computing system, wherein the computing system includes a server and a hardware accelerator, and wherein, prior to the transient workload spike, a service time of the server in responding to incoming workloads is less than a service time of the hardware accelerator in responding to the incoming workloads, wherein a window-based prediction model is used to predict the transient workload spike and a window size of the window-based prediction model is increased when workload variation in the monitored historical data is less than a first percentage and is decreased when the workload variation is more than a second percentage, wherein the first percentage is less than the second percentage;

monitoring values of the service time of the server in servicing the incoming workloads distributed to the server;

predicting that a value of the service time of the server will exceed a threshold value for the service time at a time prior to or during the predicted transient workload spike;

responsive to predicting that the value of the service time will exceed the threshold value for the service time, determining that the service time of the server, in responding to the incoming workloads distributed to the server, will exceed the service time of the hardware accelerator during the predicted transient workload spike; and responsive to the determination, offloading at least one incoming workloads of the incoming workload distributed to the server to the hardware accelerator and executing the at least one incoming workload on the hardware accelerator.

2. The method of claim 1, wherein the hardware accelerator comprises a System on a Chip (SOC) based Smart Network Interface Card (SmartNIC).

3. The method of claim 1, wherein the monitored historical data is specific to an application and distributing the at least one incoming workload is for the application.

4. The method of claim 3, wherein the threshold value for the service time corresponds to a specification in a service level agreement for the application.

5. The method of claim 1, wherein:

the past workloads received by the computing system are past serverless queries received by the computing system;

the at least one incoming workload is at least one incoming serverless query; and the at least one incoming serverless query is executed within a workload container at the hardware accelerator.

6. The method of claim 5, wherein the workload container at the hardware accelerator is started before the predicted transient workload spike.

7. The method of claim 6, wherein the starting the workload container comprising starting a containerized runtime environment on the hardware accelerator prior to arrival of the predicted transient spike.

8. The method of claim 1, wherein the transient workload spike is predicted based on a support vector regression (SVR) prediction model.

9. A computing system comprising:

a plurality of processing resources associated with the computing system; and a non-transitory computer-readable medium, coupled to the plurality of processing resources, having stored therein instructions that when executed by the processing resources cause the computing system to:

predict a transient workload spike based on monitored historical data regarding past workloads received by the computing system, wherein the computing system includes a server and a hardware accelerator, and wherein, prior to the transient workload spike, a service time of the server in responding to incoming workloads is less than a service time of the hardware accelerator in responding to the incoming workloads, wherein a window-based prediction model is used to predict the transient workload spike and a window size of the window-based prediction model is increased when workload variation in the monitored historical data is less than a first percentage and is decreased when the workload variation is more than a second percentage, wherein the first percentage is less than the second percentage;

predict that a value of a service time of the computing system will exceed a threshold value of the service time at a time prior to or during the predicted transient workload spike unless at least one incoming workload is distributed to the hardware accelerator;

start a workload container at the hardware accelerator prior to the predicted transient workload spike; and based on responsive to predicting that the value of the service time will exceed the threshold value for the service time, determining that the service time of the server will exceed the service time of the hardware accelerator during the predicted transient workload spike; and responsive to the determination, offloading at least one incoming workload distributed to the server to a workload container at the hardware accelerator and executing the at least one incoming workload by the workload container at the hardware accelerator.

10. The computing system of claim 9, wherein the threshold value for the service time corresponds to a specification in a service level agreement.

11. The computing system of claim 9, wherein the hardware accelerator comprises a network accelerator.

12. The computing system of claim 11, wherein the network accelerator comprises a System on a Chip (SOC) based Smart Network Interface Card (SmartNIC).

13. The computing system of claim 9, wherein the transient workload spike is predicted based on a support vector regression (SVR) prediction model.

14. The computing system of claim 9, wherein the monitored historical data is specific to an application and distributing the at least one incoming workload is for the application.

15. A non-transitory computer-readable medium storing instructions, which when executed by a plurality of processing resources of an edge-computing system, cause the edge-computing system to:

receive a query from an Application Programming Interface (API) gateway of the edge-computing system, wherein the edge-computing system includes an edge server and a hardware accelerator;

predict a transient workload spike using a window-based prediction model, a window size of the window-based prediction model is increased when workload variation in monitored historical data is less than a first percentage and is decreased when the workload variation is more than a second percentage, wherein the first percentage is less than the second percentage;

based on a determination that the transient workload spike exceeds a threshold value of a service time of the edge server, determine a distribution of queries over a time horizon which includes the predicted transient workload spike, and determine that, during the predicted transient workload spike, the service time of the edge server in responding to the distribution of queries will exceed a service time of the hardware accelerator in responding to the distribution of queries, wherein the service time of the edge server is less than the service time of the hardware accelerator prior to the transient workload spike; and based on the determined distribution of queries and on the determination that the service time of the edge server will exceed the service time of the hardware accelerator during the predicted transient workload spike, offload the query from the edge server to a workload container at the hardware accelerator and execute the query by the workload container at the hardware accelerator.

16. The non-transitory computer-readable medium of claim 15, wherein the hardware accelerator comprises a System on a Chip (SOC) based Smart Network Interface Card (SmartNIC).

17. The non-transitory computer-readable medium of claim 15, wherein the workload container at the hardware accelerator is started before the predicted transient workload spike.

18. The non-transitory computer-readable medium of claim 17, wherein the monitored historical data is specific to an application.

* * * * *